(12) United States Patent
Geng

(10) Patent No.: US 7,098,872 B2
(45) Date of Patent: Aug. 29, 2006

(54) METHOD AND APPARATUS FOR AN INTERACTIVE VOLUMETRIC THREE DIMENSIONAL DISPLAY

(75) Inventor: Zheng J Geng, Rockville, MD (US)

(73) Assignee: Genex Technologies, Inc., Kensington, MD (US)

( * ) Notice: Subject to any disclaimer, the term of this patent is extended or adjusted under 35 U.S.C. 154(b) by 4 days.

(21) Appl. No.: 10/964,222

(22) Filed: Oct. 12, 2004

(65) Prior Publication Data

US 2005/0062684 A1    Mar. 24, 2005

(51) Int. Cl.
    *G09G 3/30* (2006.01)
(52) U.S. Cl. .................. 345/30; 345/9; 345/6; 345/156
(58) Field of Classification Search .................... 345/6, 345/30–32, 419, 653, 156, 139, 9
    See application file for complete search history.

(56) References Cited

U.S. PATENT DOCUMENTS

| | | | | |
|---|---|---|---|---|
| 5,162,787 A | * | 11/1992 | Thompson et al. | 345/32 |
| 5,703,606 A | * | 12/1997 | Blundell | 345/22 |
| 6,183,088 B1 | * | 2/2001 | LoRe et al. | 353/7 |
| 6,302,542 B1 | * | 10/2001 | Tsao | 353/7 |

* cited by examiner

*Primary Examiner*—Richard Hjerpe
*Assistant Examiner*—Jean Lesperance
(74) *Attorney, Agent, or Firm*—Steven L. Nichols; Rader, Fishman & Grauer PLLC

(57) ABSTRACT

A process and system for interactively displaying large (more than 1 million voxels) volumetric 3D images utilizing a sequence of helical slices of a 3D data set to generate a series of 2D images on a reflective surface of a light modulator. The series of 2D images generated on the light modulator are projected into a volumetric 3D-space display using an illumination light source and projection optics. Voxels in 3D space are illuminated for each 2D projected image, each voxel being located at its corresponding spatial location. A pulse from a wireless pulsed laser pointer forms a 3D bright voxel within the display volume. The pulse signal is synchronized with the rotating helix, and the orientation of the pointer and the phase of the pulse are controlled by the user to specify a 3D point in 3D space. A wireless receiver provides six degree-of-freedom (DOF) position of the spatial location of the pointer, as well as the phase signal. Optical encoders provide synchronization signals of the rotating helical display.

14 Claims, 3 Drawing Sheets

METHOD AND APPARATUS FOR AN INTERACTIVE VOLUMETRIC THREE DIMENSIONAL DISPLAY

CLAIM OF PRIORITY

This application claims the benefit under 35 U.S.C. § 119(e) of U.S. provisional patent application Ser. No. 60/178,696, filed Jan. 28, 2000, which is incorporated herein by reference in its entirety. This application further claims the benefit under 35 U.S.C. § 120 of U.S. patent application Ser. No. 09/770,538, which is incorporated herein by reference in its entirety.

BACKGROUND OF THE INVENTION

1. Field of the Invention

This invention presents a method and apparatus for an interactive high-resolution volumetric three-dimensional (3D) display using fast spatial light modulators (SLM), a moving image screen, and a wireless pulsed laser pointer.

2. Description of the Related Art

A Brief Survey of Prior Art on Volumetric 3D Display Techniques

In this section, we provide a brief survey of a number of 3D volumetric display techniques that have been intensively developed recently by several research groups.

Solid State Up-Conversion

A fundamental requirement of a volumetric 3D display system is to have an entire volume filled with materials that can be selectively excited at any desired locations. To achieve this goal, one can have two independently controlled radiation beams that activate a voxel only when they intersect. While electron beams can not be used for such a purpose, laser beams can, provided that a suitable excitable material can be found. A process known as two-photon up-conversion can achieve this objective (U.S. Pat. No. 4,041,476 by Swainson, 1977, U.S. Pat. No. 5,684,621 by Downing, 1997). Briefly, this process uses the energy of two IR photons to pump a material into an excited level from which it can make a visible fluorescent transition to a low level. For this process to be useful as a display medium it must exhibit two photon absorption from two different wavelengths so that a voxel is turned on only at the intersection of two independently scanned laser sources. The materials of choice at the present time are the rare earth metals doped into a glass host known as ZBLAN. ZBLAN is a flurozirconate glass whose chemical name stands for $ZrF_4$—$BaF_2$—$LaF_3$—$AlF_3$—NaF. The two photon up-conversion concept for 3D volumetric display is quite promising, since it requires no moving parts. However, the major difficulties to produce a practically useful 3D display using this approach are its scale-up capability and color capability.

Gas Medium Up-Conversion

Another 3D Display based on the up-conversion concept employs the intersection of two laser beams in an atomic vapor, and subsequent omnidirectional florescence from the intersection point (U.S. Pat. No. 4,881,068, November 1989). Two lasers are directed via mirrors and x-y scanners towards an enclosure containing an appropriate gaseous species (rubidium vapor, for example), where they intersect at 90 degrees. Either laser by itself causes no visible fluorescence. However, where both laser are incident on the same gas atoms, two step excitation results in florescence at the intersecting point. By scanning the intersection point faster enough, a 3D image can be drawn in the vapor. The eye can not see changes faster that about 15 Hz, so that if the image to be displayed is repeatedly drawn faster than this rate, the image will appear to be steady, even though light may be originating from any one point in the volume for only a small fraction of the time.

The advantage of this 3D display concept is its scalability: It can be built in almost any desirable size without significantly increasing the complexity of the system. The technical difficulties in implementing this concept including the requirement of a vacuum chamber, the requirement for maintaining a certain temperature, the limitation on the number of voxels due to the speed of the scanners, and concern for the safety of the eyes of viewers due to the use of laser beams.

Rotating Light Emitting Diodes (LEDs) Array

One of the earliest volumetric 3D displays was designed by Schipper (U.S. Pat. No. 3,097,261, 1963). It consists of a rotating electroluminescent panel with an embedded high-speed light emitter array. By controlling the timing of the x-y addressing of the light emitter array and the rotation of the panel, 3D images can be formed within the volume swept by the rotating panel. In 1979, Berlin developed an innovative approach to solving the high-bandwidth data transmission problem of this design using an optical link and replaced the light emitters with a high speed LED (Light Emitter Diode) matrix (U.S. Pat. No. 4,160,973 by Berlin, 1979). This system uses a 3D array of LEDs that are rotated to sweep out a 3D volume. The resolution of this volume is a function of the number and density of LEDs mounted on the rotating planar array, the speed of rotation and the rate at which the LEDs can be pulsed.

Cathode Ray Sphere

The Cathode Ray Sphere (CRS) concept was originally developed by Ketchpel in the 1960s (U.S. Pat. No. 3,140, 415 by Ketchpel, 1960) and recently implemented by researchers in New Zealand (U.S. Pat. No. 5,703,606 December 1997 Blundell). The voxels are created by addressing a rapidly rotating phosphor-coated target screen in vacuum by electron beams synchronized to the screen's rotation. The view of this rotating multiple planar surface depends on the clarity of the glass enclosure and the translucency of the rotating screen. Another image quality issue is the interaction between the phosphor decay rate and the speed of the rotation of the screen.

Varifocal Mirror and High Speed Monitor

A very clever method of 3D display employs the strategy of forming optical virtual 3D images in space in front of a viewer using a varifocal minor system (U.S. Pat. No. 4,130, 832 by Sher, 1978). The varifocal mirror system consists of a vibrating circular mirror along with a high-speed monitor. The monitor is connected to a woofer such that the woofer can be synchronized to the monitor. A flexible, circular mirror is attached to the front of the woofer, and the monitor is pointed toward the mirror. With the vibrations from the woofer, the mirror changes focal length and the different points being displayed on the monitor seem to appear at different physical locations in space, giving the appearance of different depths to different objects in the scene being displayed. Variable mirror based 3D display systems are primarily limited by the size of the mirror and updating rate of images, since this mirror has to vibrate.

Laser Scanning Rotating Helix 3D Display

Extensive attempts have been made by researchers at Texas Instruments (U.S. Pat. Nos. 5,042,909, 5,162,787, etc.) to develop a 3D display device based on laser scanning and a rotating (helical) surface. Lasers scanning 3D displays operate by deflecting a beam of coherent light generated by a laser to a rotating helical surface. Timing modulation of the laser beam controls the height of the light spot that is produced by the laser on the rotating surface. The deflectors include devices such as polygonal mirrors, galvanometers, acousto-optics modulated deflectors, and micro-deformable mirrors. There are several problems with this 3D display mechanism that have prevented it from becoming commercially feasible.

The most serious problem is the limitation on the maximum number of voxels that can be displayed. Due to the nature of sequential (non-parallel) laser scanning, only one spot of light can be displayed at any given moment. All the activated image voxels have to be addressed, one by one, by the scanning of a single laser beam in time-multiplex fashion. The time needed for scanning the laser beam, including holding the laser on a particular voxel position long enough to produce sufficient brightness, poses an upper limit to how many voxels the device can display. To increase the number of voxels, multiple channel lasers and scanners could be used. However, many attempts to increase the spatial resolution have been hampered with high cost and bulky hardware design.

As shown in the previously mentioned patents and techniques, there has been a research and development effort for obtaining a true volumetric 3D display. However, none of them is able to provide high-resolution volumetric 3D images with over one million voxels. Further, none of them is able to provide a dynamic interaction with a true volumetric 3D display.

SUMMARY OF THE INVENTION

The primary objective of the present invention is to provide a method and apparatus to display high-resolution volumetric three-dimensional images that enables a collaborative interactive visualization environment for mission planning and situation awareness in a wide variety of applications.

To achieve these and other objects of the invention, one aspect of the invention is to provide a volumetric three dimensional display device with an interactive pointer. The device comprises a rotating helical display screen that sweeps out a cylindrical three-dimensional display space. A projector projects two-dimensional slices of a three-dimensional data set on the rotating helical display screen so as to generate a three-dimensional volumetric display on the helical display screen. A laser pointer generates a pulsed laser beam. The pulsed laser beam is pulsed at a period matching a rotational period of the helical display screen. If the pointer is maintained in a constant orientation relative to the helical display screen, then the laser beam strikes the rotating screen at a single constant point in the three-dimensional display space each time that the screen rotates.

In another aspect of the invention, a volumetric three-dimensional display device comprises a rotating helical display screen that sweeps out a cylindrical three-dimensional display space. A first projector projects two-dimensional slices of a three-dimensional data set on the rotating helical screen so as to generate a three-dimensional volumetric display on the screen. A second projector projects a two-dimensional image that is superimposed on the three-dimensional volumetric display. A slotted plate is positioned in the projection path of the second projector, wherein the slotted plate rotates in synchronization with the rotating helical display screen.

DESCRIPTION OF THE PREFERRED EMBODIMENT

Figure 1:
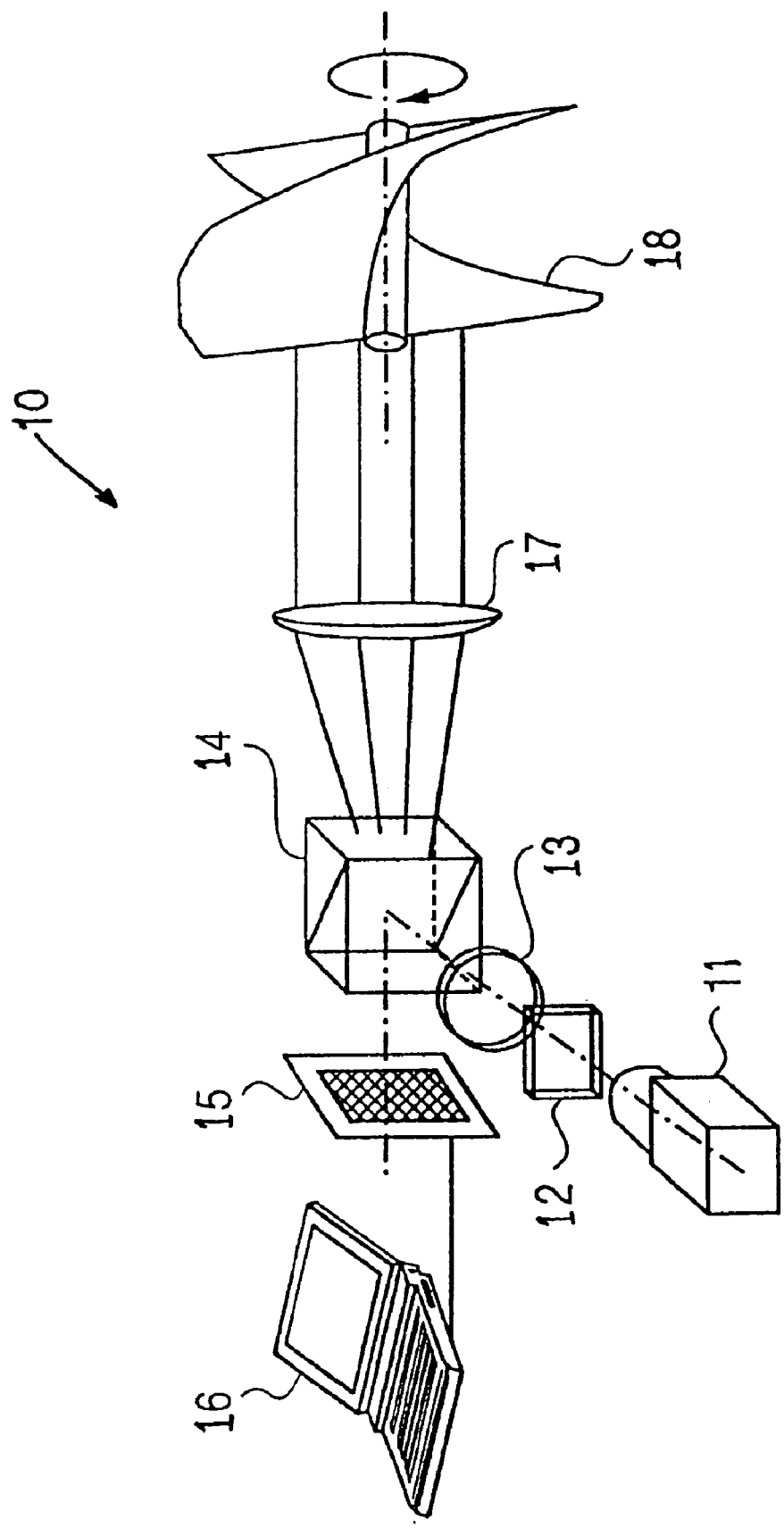
FIG. 1 shows an embodiment of the SLM/Helix 3D display with a front projection configuration.

Referring now to FIG. 1, a SLM/Helix 3D display system 10 that involves the use of a rotating helical screen that continuously sweeps out a cylindrical volume that becomes a 3D display space is disclosed. A complete discussion of the SLM/Helix 3D display system 10 is disclosed in U.S. Pat. No. 6,064,423, the contents of which are herein incorporated by reference in its entirety.

In general, the SLM/Helix 3D display system 10 includes a projector 11 that produces light rays that pass through a UV and IR cut-off filter 12 and a collimating lens 13 that impinge on a polarizing beamsplitter cube 14 (commonly known as a beamsplitter). Due to the polarization characteristics of the beamsplitter cube 14, the polarized light rays are reflected by the beamsplitter cube 14 and projected onto a spatial light modulator (SLM) 15. A host computer 16 generates the image data shown on the SLM 15. The SLM 15 is able to alternate image patterns at a high frame rate (over 3,000 frames per second, for example). When a pixel on the SLM 15 is turned ON, the light will be reflected back to the beamsplitter cube 14, while when the pixel is turned OFF, the projected light on this pixel will be absorbed by the SLM 15 and will not be reflected. The patterns on the SLM 15 are therefore able to control the patterns of the reflected light rays. The reflected light rays encoded with the SLM image patterns transmit through the beamsplitter cube 14. An optical projection lens system 17 is employed to project the image patterns towards a spinning helix screen, indicated at 18. The light spots projected on the helical display screen 18 intersect the helix surface at different heights depending on the different rotating angle of the helix, thus forming 3D voxels in 3D space. Each section of the helix surface can be described by the following mathematical equations:

$$y = x\tan\gamma, \quad z = \frac{H\gamma}{180} = p\gamma, \gamma \in [0, 360°], x \in [0, R],$$

where, $\gamma$ is the angular position measured from the leading edge of the helix surface, and p is a proportional coefficient.

If we synchronize the rotating motion of the helical display screen 18 with the pattern switching timing of the SLM 15, such that 3D image patterns are shown in the 3D space with a high refresh rate (over 20 Hz for example), human eyes perceive them as true 3D volumetric images. Viewing such images requires no special eyewear. The 3D image is floating in true 3D space, just as if the real object were placed there.

Advantages of the SLM/Helix 3D display system 10 include:

Inherent parallel architecture for voxel-addressing: Instead of using single a laser beam to address all the voxels (such as prior art of scanning laser helix system), the SLM/Helix system use a two dimensional array of light rays (256 by 256 rays, for example) to simultaneously address 3D voxels, thus overcomes the bottleneck in producing high resolution, 3D images using other approaches.

High Spatial Resolution: The maximum number of voxels that can be generated by the SLM/Helix display depends upon the spatial resolution of SLM and the spinning speed of the helix screen. With currently available SLM technology, SLM devices with a resolution of 1024 by 1024 pixel and frame rate of 300,000 frames per second are on the market. Therefore a 3D display device with over one-million voxels is practically implementable.

Simple structure and easy to build. There is no mechanical scanning or complex timing related problem in the SLM/helix design. The optical alignment is not difficult to implement.

No viewing glasses or helmet is needed by viewers: The volumetric images are displayed in true 3D space with all-around viewing angle, which preserves physiological and psychological depth cues for the human visual system. Viewers can walk freely around the monitor to see the 3D images, just as if the real 3D object were sitting there.

Implementation of full color display is straightforward: Use three SLMs for Red, Green, and Blue respectively, and the color of voxels can be automatically controlled. Another way to implement color display is even simpler: use Red, Green and Blue light projector, and synchronize the timing of three projectors with a high speed SLM.

From the viewpoint of optical projection, the configuration of the SLM/Helix 3D display system 10 shown in FIG. 1 is a "front projection system (FPS)". This means that images are projected onto the rotating helix surface from the same side as viewers view the 3D images. The front projection design of a 3D display makes it easier to implement the motion control for the rotating helix. It also provides convenience in adjusting optical system setups and modifying other components or subsystems.

The SLM/Helix 3D display system 10 can also have a rear projection system (RPS)" design configuration as described in U.S. Pat. No. 6,064,423, the disclosure of which is herein incorporated by reference in its entirety. In the RPS configuration, image patterns are projected onto the rotating helix screen from below, while viewers view 3D images from above. The helix surface is made of semi-transparent material so that it transmits 50% light and reflects 50% light. Therefore, it can diffuse the light spots projected by the image projector to form voxels that can be viewed from both sides of the helix surface (i.e., from virtually omnidirections).

A major advantage of using the RPS configuration is that it is possible to achieve a compact system design. All the components of the SLM/Helix 3D display system can be packaged into a cabinet with the 3D display volume on the top. From the viewpoint of commercial product design, RPS may be a much better system design configuration for a volumetric 3D display device.

The 3D display system shown in FIG. 1 provides a new generation of volumetric 3D display devices by using a rotating helix screen. This system takes advantage of recent advances in material, laser, and semiconductor fabrication technologies. For example, newly developed ferrorelectric liquid crystal spatial light modulator technology provides a spatial light modulator (SLM) with a switching speed of over 3,000 frames per second, each frame being, for example, 256 by 256 pixels. Higher resolutions, i.e., more pixels, are also possible. Such a fast SLM can be used as a high-speed image pattern generator to produce volumetric 3D images on a rotating helical screen, thereby providing a powerful tool to revolutionize the state-of-the-art of in the field of 3D volumetric displays. Further discussion of SLM technology is described in U.S. Pat. No. 6,064,423, the disclosure of which is herein incorporated by reference in its entirety.

Design and Implementation of a True Volumetric 3D Mouse that can Produce 3D Cursor(s) within the 3D Display Volume.

With the improved capability of the 3D volumetric display device and the many applications thereof as described above, it becomes possible for groups of people to use a volumetric 3D display for collaborative efforts. It has been demonstrated that people who must collaborate with regard to a 3D object or system can much more readily communicate and reach consensus about the object or system in question by using a volumetric 3D display rather than 2D representations of that object or system. This collaborative process would be facilitated by a means allowing the collaborators to dynamically interact with the volumetric 3D display, i.e., being able to point to specific points on the display to direct another's attention.

The present invention aims to provide such dynamic interaction with a volumetric 3D display device, such as the type disclosed in co-assigned U.S. Pat. No. 6,064,423, the disclosure of which is herein incorporated by reference in its entirety. Such dynamic interaction between viewers and the displayed 3D objects becomes possible under the principles of the present invention.

For example, it has been demonstrated that an operator can arbitrarily specify a point on the spatial configuration of a 3D object (in a 6 DOF parametric space) using a conventional mouse, and the displayed 3D object can react to the user's command in real-time to generate an indication in the 3D volumetric display of the location specified using the mouse. However, conventional mouse devices are designed for indicating locations in 2D space. They are not designed for true volumetric 3D interaction. Consequently, the user must identify the point to be highlighted in the 3D display using 2D representations of the 3D display on the computer (indicated at 6, FIG. 2). Therefore, the user is unable to intuitively specify a point or a small volume in a true 3D space. Thus, it is difficult to directly interact with a displayed 3D objects in the volumetric display device using a conventional a mouse.

Figure 2:
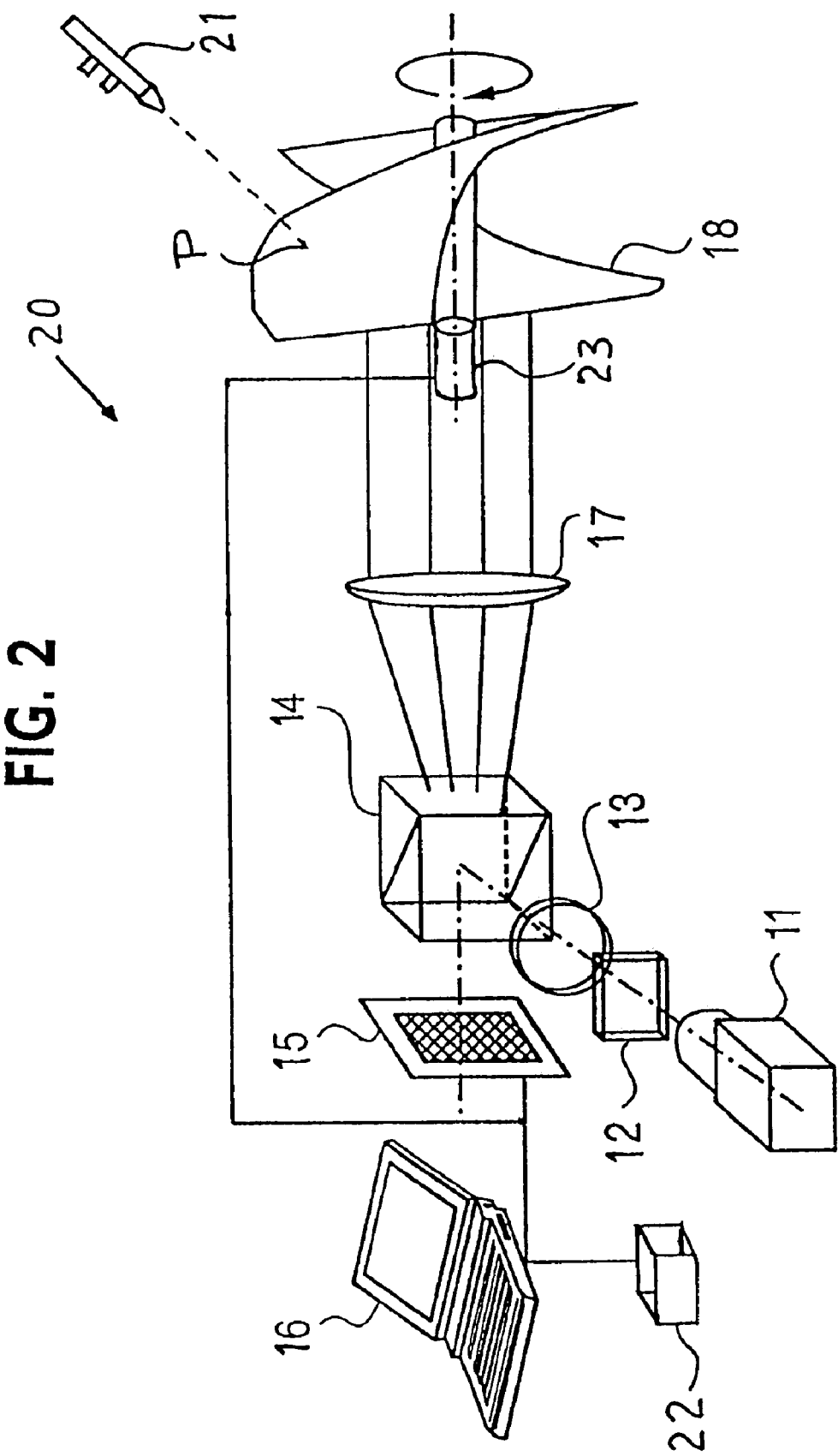
FIG. 2 shows an interactive SLM/Helix 3D display with a wireless pulsed laser pointer and receiver according to an embodiment of the invention.

Referring now to FIG. 2, an interactive display device, shown generally at 20, for immediately and intuitively indicating a point or volume of a 3D image displayed volumetrically in true 3D space is disclosed. The interactive display device 20 has been dubbed the "Lighting Bug."

Under the principles of the present invention, the interactive display device 20 mainly comprises a wireless pulsed laser pointer 21 and a wireless receiver unit 22. The wireless pulsed laser pointer 21 can be held and directed by a user to pinpoint or indicate a point or volume within a volumetric display. Furthermore, the pointer 21 can communicate its orientation wirelessly to the system through a receiver unit 22 so as to indicate to the system the path of laser beam coming from the pointer 21. The incidence of the resulting laser beam on the 3D object being displayed can therefore be determined by the SLM/Helix 3D display system 10.

As noted above, the laser from the pointer 21 is pulsed. The phase of the laser's pulse is adjustable by the user through a control on the pointer 21. The range of phases at which the pointer 21 can pulse the laser light correspond to the phases for rotation of various points on the helical display screen 18 the of SLM/Helix 3D display system 10. Consequently, the wireless laser pointer 21 can light a particular point in the 3D display along the beam path where the laser beam impinges the helix surface of the helical display screen 18 by controlling the related phase of the pulsed laser from the pointer 21 with respect to the rotating position of the helical display screen 18. Due to the synchronization of the laser pulse and the rotation of the helical display screen 18, the pulsed laser beam strikes the same spatial point, P, every time the helical display screen 18 reaches the same angular position during each rotation of the helical display screen 18, thereby creating a bright spot in 3D space (i.e., a lighting bug in the display volume).

The spatial location and orientation of the wireless pointer 21 is sensed by the receiver 22, together with the phase difference between the laser pulse of the pointer 21 and the index of rotation of the helical display screen 18. The orientation and position sensing capability for the wireless pointer 21 can be achieved by a number of commercially available six degrees-of-freedom (DOF) position-sensing or orientation sensors located in the pointer 21 and communicating wirelessly with the receiver 22. One embodiment of the invention can use a six DOF magnetic sensor whose sensing range is over 10 cubic feet. Such systems are commercially available. Specifications for a suitable six DOF sensor are listed in Table 2. One such system is made by Ascension Technology Corporation of Vermont is called the pcBRID. The pcBIRD is a six DOF tracker hosted by a PC card. It measures the $[x,y,z,\alpha,\beta,\gamma]$ position of its small sensor and meets the specifications listed in Table 2. Its electronics board plugs into the ISA slot of the host PC computer 16 and provides sufficiently fast delivery of the sensed data for purposes of the present invention.

TABLE 2

Specification of the 6 DOF sensor.

| Measurement Range | 4' |
|---|---|
| Translation Accuracy | 2 mm |
| Angular Accuracy | 1 degree |
| Speed | >100 times per sec. |
| Dimension | 1.0" × 1.0" × 0.8" |

The phase signal of the pulsed laser is extracted by an electric circuit residing in the wireless pointer 21 and is transmitted by a wireless link to the receive unit 22. The control computer 16 processes the six DOF position signal to determine the laser beam path specified by the user. An optical encoder 23 provides the computer 16 an index sensor signal from the rotating helical display screen 18 and the pulse that triggers the laser of the pointer 21. Then, the computer 16 calculates the phase difference between the index sensor signal from the rotating helical display screen 18 and the pulse that triggers the laser of the pointer 21. This phase difference information, together with the geometric configuration of the rotating helical display screen 18, allows a commercially available software program executed on the computer 16 to determine the impinging point of the laser beam on the rotating helical display screen 18. This impinging point is then used as the output of the lighting bug 3D pointer 21.

Preferably, a red laser diode and/or green laser diode can be selected as components of the pointer 21. In order to display a 3D cursor in the 3D volume consistently, the ON/OFF timing of the laser(s) on the 3D mouse device 21 should be synchronized with the rotating position of the helical display screen 18. In order to change the spatial location of the 3D cursor, the user must be able to change the phase or delay of the laser pulse signal with respect to the index signal of the rotating helical display screen 18. Also, the size of the cursor can be adjusted via the shape of the laser pulse signal.

A Hybrid Mechanism for Displaying High-Resolution 2D Image Slices Within the 3D Volume In 3D visualization applications, there are needs for displaying high resolution (2024 by 2024 pixels, for example) full color image slices with an image stack consisting of multiple image slices in true 3D volume in the depth corresponding to their spatial locations. These images may contain alphabetic/text/symbols associated with 3D objects displayed within the 3D volume (For example, Icon and alphanumeric information imprinted on the scan images provide details of operating parameters of a satellite). Although we can design 3D fonts for the alphanumerics, the spatial resolution of the SLM/Helix approach to the volumetric 3D display is inherently determined by the resolution of the SLM chip and may not readily support the display of 3D alphanumerics. Current SLM technology offers a 256 by 256 binary SLM that can be modulated at a frequency of 2500 Hz. Further increase of the spatial resolution is possible with the maturity of the SLM fabrication technology.

Figure 3:
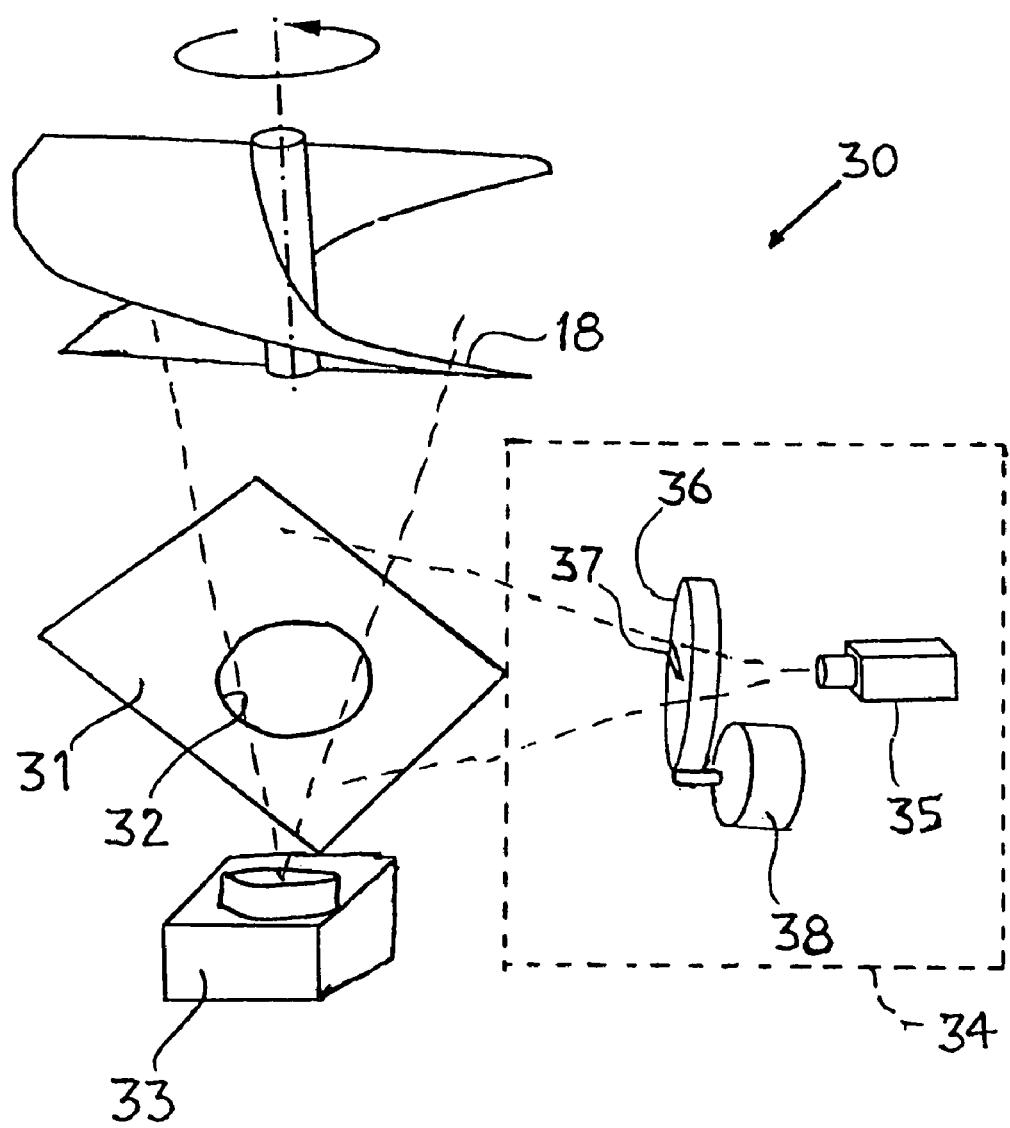
FIG. 3 shows a hybrid device to display a high resolution full color 2D image slice and/or alphanumeric symbol.

Rather than waiting for the maturity of the SLM device to increase in spatial resolution, however, the present invention employs a hybrid device, shown generally at 30 in FIG. 3. The hybrid device 30 combines the volumetric display capability of the display device disclosed in U.S. Pat. No. 6,064,423, for example, with high resolution 2D display.

As shown in FIG. 3, a mirror 31 is disposed in the optical path of the 3D image projection. The mirror 31 has a centrally located aperture 32 allowing for the 3D image projection from a high speed 3D image projector 33 to pass therethrough. A 2D image slice generator slice image generator, shown generally at 34, is then directed at the mirror 31. The 2D image slice generator slice image generator 34 includes a high-resolution full-color 2D image projector 35 and a rotating plate 36 with a slot 37.

The projected 2D image is reflected by the mirror 31 onto the helical display screen 18 in the 3D display space. The rotating slotted plate 36 is synchronized with the rotation of the helical display screen 18. Therefore, the portion of the 2D image passing through the slot 37 and reflected onto the surface of the helical display screen 18 at any given time will always intersect the same portion of the helical display screen 18. Therefore, the portion of the 2D image passing through the slot 37 will appear on the surface of the helical display screen 18 at a fixed height and position within the cylindrical display volume swept by the helical display screen 18. The hydrid device 30 effectively forms a horizontal 2D image plane within the 3D display volume. The phase relationship between the rotation of helical display screen 18 and that of the slotted plate 36 can be adjusted so that the height of the 2D image plane within the 3D display space is adjusted. Therefore, the 2D image plane can be adjusted so that any image displayed on the 2D image plane, for example alphanumeric text, can be spatially associated with corresponding elements of the 3D display.

In an alternative embodiment, a beamsplitter, similar to type of beamsplitter 14 shown in FIG. 1, can be used in place of the mirror 31. Such a beamsplitter would preferably have 50% transmission and 50% reflection characteristics. The principles of projecting the 2D images and the 3D images will remain the same if the beamsplitter is used.

Using the hybrid device 30, high-resolution 2D images (such as terrain and weather information slices and stack or text/alphabetic/symbols) can be displayed at the spatial location where they are supposed to be, thus providing additional visual cues to the viewers to perceive the 3D spatial relationship.

The high-speed and high-resolution 2D image projector 35 may be implemented using, for example, a high quality LCD projector, electron-gun tubes (such as those used in the projection TV), or deformable mirror devices (DMD). Image resolution, switching speed, and interface with computer are among factors that need to be considered in selecting an appropriate 2D image projector. A commercial video projector that has 2K by 2K pixel resolution and RGB colors may be suitable.

A rotary encoder (not shown) of a type known in the art may be operatively coupled to a motor (not shown) used to rotate the helical display screen 18 to constantly determine accurately the rotational position of the helical display screen 18. The output of the encoder can be used to synchronize the rotating slotted plate 36 with the rotation of the helical display screen 18. This is accomplished by providing a signal output by the encoder to a motor 38 that drives the plate having at least one slot. The motor 38 uses this signal to synchronize with the rotating helical display screen 18 so that the image passing through the slot(s) of the plate 36 will be at a desired and constant position on the helical display screen 18 within the 2D image plane and relative to the 3D display space. The synchronization between the helical display screen 18 and the slotted plate 36 can be implemented either electronically or mechanically.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of providing a volumetric three dimensional display device with an interactive laser pointer, the method comprising the steps of:

rotating a helical display screen that sweeps out a cylindrical three-dimensional display space;

projecting two-dimensional slices of a three-dimensional data set on said rotating helical display screen so as to generate a three-dimensional volumetric display with said rotating helical display screen; and generating a pulsed laser beam with said interactive laser pointer to selectively and visually indicate a single point in the three-dimensional volumetric display.

2. The method of claim 1, further comprising, in addition to said two-dimensional slices of said three-dimensional data set, selectively projecting a separate two-dimensional image in synchronization with rotation of said rotating helical screen such that said two-dimension image appears as superimposed on said three-dimensional volumetric display.

3. The method of claim 1, further comprising the step of transmitting a signal indicating said pointer's orientation relative to said three-dimensional. display space.

4. The method of claim 1, further comprising the step of receiving said signal indicating said pointer's orientation relative to said three-dimensional display space, wherein said received signal is provided to a central processor of said display device and said three-dimensional volumetric display is modified to indicate that section of said three-dimensional display space at which said pulsed laser beam strikes said rotating helical display screen.

5. The method of claim 1, wherein said pulsed laser beam selectively indicates a single point in said volumetric display by creating a point of light on said display screen.

6. The method of claim 1, further comprising synchronizing pulses of said pulsed laser beam with rotation of said display screen, such that, if said interactive pointer is not moved, said laser beam will strike only a single point on said display screen.

7. A method of providing a volumetric three-dimensional display device, comprising the steps of:

rotating a helical display screen that sweeps out a cylindrical three-dimensional display space;

projecting two-dimensional slices of a three-dimensional data set on said rotating helical screen so as to generate a three-dimensional volumetric display with said screen; and in addition to said two-dimensional slices of said three-dimensional data set, selectively projecting a separate two-dimensional image in synchronization with rotation of said rotating helical screen such that said two-dimensional image appears as superimposed on said three-dimensional volumetric display.

8. The method of claim 7, further comprising generating a pulsed laser beam with said interactive laser pointer to selectively indicate a single point in the three-dimensional volumetric display.

9. A volumetric three dimensional display device with an interactive pointer, the device comprising:

a rotating helical display screen that sweeps out a cylindrical three-dimensional display space;

a projector for projecting two-dimensional slices of a three-dimensional data set on said rotating helical display screen so as to generate a three-dimensional volumetric display on said rotating helical display screen; and a hand-held laser pointer generating a pulsed laser beam which a user directs at said rotating display screen to selectively and visually indicate a single point on the tree-dimensional volumetric display.

10. The display device of claim 9, wherein said projector comprises a spatial light modulator.

11. The display device of claim 9, wherein said laser pointer further comprises an orientation sensor and said laser pointer wirelessly transmits a signal indicating said pointer's orientation relative to said three-dimensional display space.

12. The display device of claim 11, wherein said display device further comprises a wireless receiver for receiving said signal indicating said pointer's orientation relative to said three-dimensional display space, wherein said received signal is provided to a central processor of said display device and said three-dimensional volumetric display is modified to indicate that section of said three-dimensional display space at which said pulsed laser beam strikes said rotating helical display screen.

13. The display device of claim 9, wherein said pulsed laser beam selectively indicates a single point in said volumetric display by creating a point of light on said display screen.

14. The display device of claim 9, wherein pulses of said pulsed laser beam are synchronized with rotation of said display screen, such that, if said hand-held pointer is held steady by said user, said laser beam will strike only a single point on said display screen with each rotation of said display screen.

* * * * *